United States Patent [19]
Elmer et al.

[11] 3,775,078
[45] Nov. 27, 1973

[54] PROCESS FOR MAKING CARBON-CONTAINING CERAMICS

[75] Inventors: Thomas H. Elmer, Corning; Helmuth E. Meissner, Painted Post, both of N.Y.

[73] Assignee: Corning Glass Works, Corning, N.Y.

[22] Filed: May 22, 1972

[21] Appl. No.: 255,845

[52] U.S. Cl. .................. 65/32, 65/31, 117/46 CB, 117/46 CC
[51] Int. Cl. .............................................. C03c 21/00
[58] Field of Search ............................. 65/31, 32; 117/46 CB, 46 CC

[56] References Cited
UNITED STATES PATENTS
3,102,047  8/1963  Rivington ..................... 117/46 CC
2,315,329  3/1943  Hood et al. ............................ 65/31

Primary Examiner—Arthur D. Kellogg
Attorney—Clarence R. Patty, Jr. et al.

[57] ABSTRACT

A process for carbon-impregnating a refractory porous article, particularly a porous glass article, comprising the steps of impregnating the porous article with a polymerizable furan derivative, polymerizing the furan derivative in situ in the article to form a resin, and firing the article in a nonoxidizing atmosphere to a temperature at least sufficient to convert the resin to carbon, is disclosed. The resulting article has useful thermal and electrical properties.

4 Claims, 2 Drawing Figures

PROCESS FOR MAKING CARBON-CONTAINING CERAMICS

BACKGROUND OF THE INVENTION

The present process relates generally to the production of carbon-containing ceramic articles and particularly to the manufacture of carbon-containing porous glasses.

Processes for carbon-impregnating glasses in order to impart electrical conductivity thereto are known. U.S. Pat. No. 2,556,616, for example, describes a process comprising impregnating porous glasses with soluble carbohydrates, particularly sugars, followed by drying and firing to convert the sugars to carbon. The carbon phase is responsible for electrical conductivity in such glasses. There are, however, numerous disadvantages associated with the use of sugar solutions to impregnate glasses, particularly when concentrated solutions are required. Concentrated solutions have rather high viscosity and must be heated to lower viscosity if complete impregnation of porous glasses is to be achieved. The hot concentrated solutions then tend to caramelize readily to produce highly viscous solutions which can no longer permeate porous articles.

Sugar solutions are also subject to fermentation if allowed to stand in air, requiring the use of stabilizing additives to obtain useful pot life. In addition, decomposition of sugar does not take place at temperatures below about 100° C, so that migration of the sugar solution from the center of an impregnated article towards its external surface may occur on drying. This may result in a depletion of sugar (and carbon) from the center of a thick-walled structure, depriving it of the useful effects of the carbon phase. And finally, sugar contains large numbers of hydroxyl groups which can cause autooxidation of the carbon chains in the sugar and, hence, loss of some of the desired carbon from the glass.

Most of the other organic materials which have been considered for the purpose of impregnating porous ceramics also have disadvantages. A suitable pyrolyzable organic compound must be liquid or liquid-soluble, treatable to cause decomposition in situ without excessive evaporation or excessive release of thermal energy, and capable of producing large quantities of carbon decomposition products within the pore structure of the material upon suitable treatment of the refractory body. No organic impregnants yet proposed for this purpose have provided all of these features in combination with a reasonable degree of process convenience.

It is therefore, one object of the present invention to provide a process for carbon-impregnating porous glass and other refractory porous materials which provides advantages in material handling and impregnation efficiency not obtainable using sugar-impregnation or other prior art techniques.

It is further object of this invention to provide a process which produces carbon-impregnated glasses having improved thermal properties in comparison with materials produced using prior art processes.

Other objects and advantages of the invention will become apparent from the following detailed examples thereof, and from the appended DRAWING wherein FIG. 1 shows the effect of the process of the present invention on the annealing point of a porous glass, and FIG. 2 compares the viscosity-temperature curve of a carbon-impregnated glass produced according to the present invention with the viscosity-temperature curve of a carbon-glass produced according to a prior art process.

SUMMARY OF THE INVENTION

Briefly, our invention includes a process for carbon-impregnating a refractory porous article which comprises the steps of impregnating the pore structure of a porous article with a polymerizable furan derivative such as furfuryl alcohol, furfural, or furfuramide, polymerizing the furan derivative in situ in the porous article to form a resin, and firing the article in a non-oxidizing atmosphere to a temperature at least sufficient to convert the resin to carbon. For the purposes of our process, the refractory porous article may be a porous glass article, a continuously-porous refractory ceramic material such as silica, alumina or zirconia, or a continuously-porous refractory foam.

Polymerizable furan derivatives which are employed in our process are typically 2-substituted derivatives, including furfuryl alcohol, furfuramide and furfural. These may be polymerized in situ in the glass to form a black, infusible, and non-volatile resin through condensation reactions induced, for example, by heating, adding a catalytic amount of acid or acidic salts as dehydrating and/or polymerizing agents, or exposing to intensive light. Following condensation of the selected furan derivative to a resin, conversion of the resin to carbon may be accomplished by firing in a non-oxidizing atmosphere.

Carbon is an excellent drying agent, particularly for porous glass, effectively removing hydroxyl groups which, if left in the structure, soften the glass. For this purpose, relatively small amounts of furan derivatives are required to produce high-annealing-point glasses; however, higher concentrations of furan derivatives are useful to provide sufficient carbon to make the glass electrically conductive.

The selected furan derivatives may be employed either alone or in combination with other organic or inorganic diluents or solvents. They offer significant advantages over other impregnants, including low viscosity in pure or dissolved form at room temperature, and low cost. Also, no external catalyst is required for resinification, and, in the case of furfuryl alcohol and furfural, water may be used as a diluent. Examples of other diluents which may suitably be employed are aromatic phenols such as phenol and beta-napthol, and aromatic amines such as aniline, alpha-naphthylamine and p-toluidine.

DESCRIPTION OF THE PREFERRED EMBODIMENTS

Figure 1:
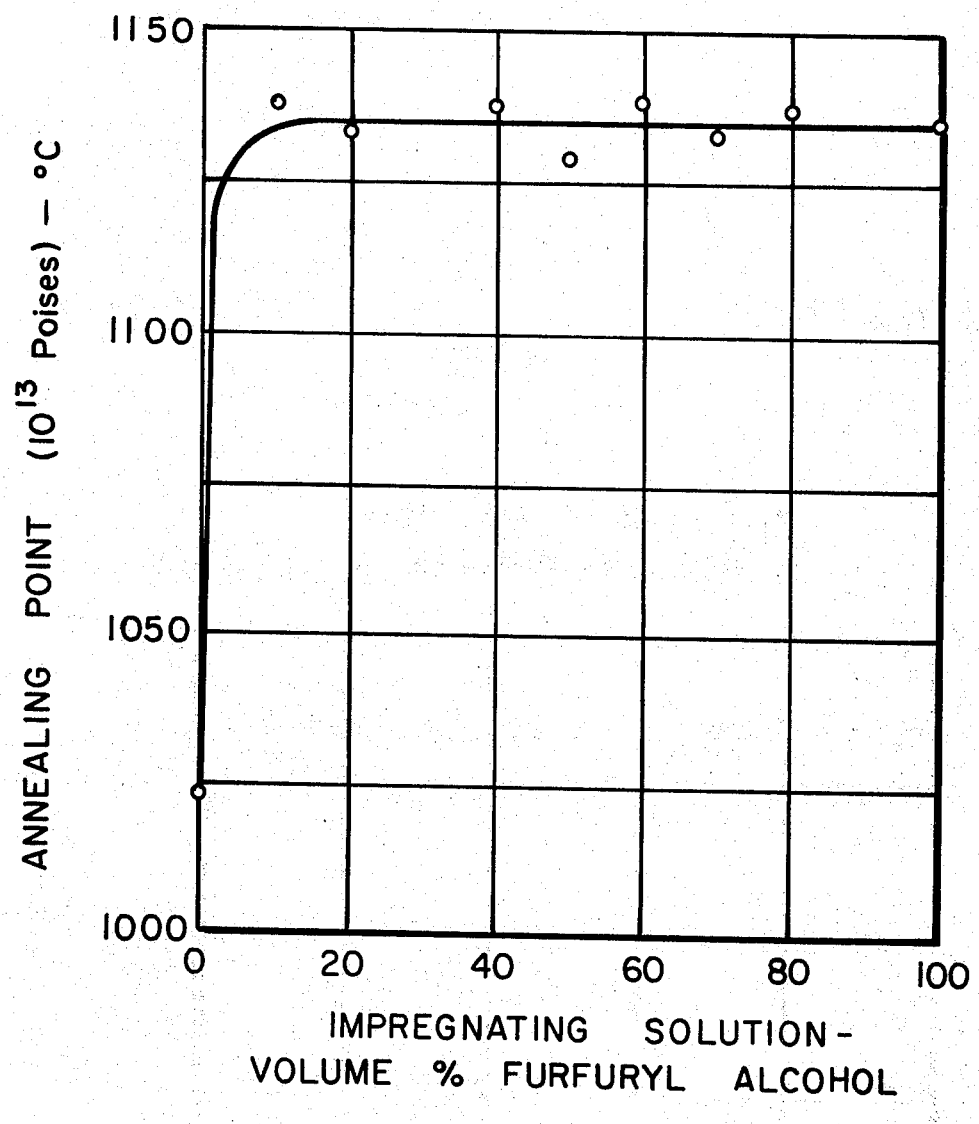
FIG. 1 of the drawing demonstrates the effect of a furfuryl alcohol impregnant on the annealing point of a porous 96 percent silica glass treated according to the process of the present invention. The points plotted are the measured annealing points ($10^{13}$ poises viscosity) of consolidated, carbon-containing glass strips which were impregnated as porous glasses with water, furfuryl alcohol or mixtures thereof, dried, and fired according to the invention. The various mixtures are shown on the horizontal axis of the diagram. The marked effect of the process of the invention on the annealing points of the treated glasses is evident; even minor amounts of impregnant significantly increase the annealing point of the glass.

The process of the present invention has particular utility in the treatment of porous glasses to increase the annealing point thereof. Examples of such glasses include high-silica porous glasses such as the so-called "96 percent silica glasses" which are used in high temperature and thermal cycling applications because of their high annealing point and low thermal expansion. The manufacture of such glasses is described in detail in U.S. Pat. No. 2,106,744 to Hood et al., generally involving the heat treatment of certain phase-separable alkali-borosilicate glasses to form an alkali- and boron-rich phase and a silica-rich phase, and the subsequent acid-leaching of the phase-separated glass to remove the alkali- and boron-rich phase. The resulting glass articles which typically comprise at least 94 percent silica by weight and have a multiplicity of interconnecting, submicroscopic pores resulting from the removal of the soluble phase, may be used as porous glasses or, optionally, consolidated to transparent, non-porous glass articles by appropriate heat treatment.

Glasses prepared by the method of the aforementioned Hood et al patent are known in the art by the general designation "96 percent silica glasses" without particular regard for the exact silica content thereof, and this general designation is used herein with that meaning. Thus it will be understood that the term "porous 96 percent silica glass" as it appears herein is used in the generic sense to include all porous alkali-borosilicate glasses produced from alkali-borosilicate glasses in accordance with the above-described method, irrespective of the exact silica content of the glass.

The furan derivative which is preferred for use in the process of the present invention is furfuryl alcohol. This compound is not only miscible with water in all proportions, but it can be readily polymerized in situ in a porous glass or other ceramic body to a non-volatile resin by heating. In addition, relatively low concentrations of furfuryl alcohol are sufficient to substantially improve the high temperature characteristics of the final glasses, and while higher concentrations do not further increase the annealing point of the glass, they do produce electrically conductive glasses.

We have found that the stability of aqueous furfuryl alcohol solutions is a function of furfuryl alcohol content, and that, particularly with solutions under about 70 percent alcohol by volume, separation into an alcohol-rich and an alcohol-poor phase can occur on standing for long periods of time. This can readily be avoided by making the solutions slightly basic, as by adding a minor amount of ammonium hydroxide, and such an addition does not interfere with the beneficial effects of the furfuryl alcohol impregnant on the properties of the resulting carbon-glasses.

Impregnation of the selected refractory porous article with a furan derivative is typically accomplished by immersion of the porous article into the furan derivative, or into a furan derivative-containing solution or mixture, for a period of time at least sufficient to insure thorough penetration by the impregnant into the pore structure of the material. Immersion treatments may range from several minutes to several days, depending on the porosity, pore size, pore configuration, thickness, and degree of dryness of the refractory porous article. In the case of a water-soaked article, for example, longer immersion times will be required to achieve concentration equilibrium with the impregnating solution than in the case of a dry article. Thus, drying of the glass prior to impregnation may in some instances be desirable.

Following immersion, the surfaces of the impregnated article are typically rinsed and freed of excess solution, and then the article is subjected to treatment to cause the polymerization of the furan derivative to a non-volatile resin in situ in the pores of the article. For this purpose, we prefer a treatment comprising gradual heating to a temperature at least sufficient to promote condensation and polymerization of the furan derivative. Temperature in excess of about 180° C are seldom required to achieve a useful degree of polymerization. Gradual heating during this stage is preferred because it allows time for the escape of water and condensation by-products of the furan polymerization process from the pore structure of the material. Excessively rapid heating rates result in pressure within the article due to trapped vapors, and the resulting stresses can cause breakage; thus the rate of heating to the condensation temperature should be below that which will cause breakage of the article.

Once the furan derivative has been converted into a non-volatile resin, firing in a non-oxidizing atmosphere is undertaken to decompose the resin to carbon. Preferably, the early stages of the decomposition process are carried out in a reducing atmosphere to minimize carbon oxidation. This may be accomplished, for example, by heating in flowing forming gas. Also, the initial heating rate should be quite low to permit the escape of water and other decomposition products and to control the rate of shrinkage of the decomposing resin. Excessively rapid shrinkage of the carbon phase can cause stresses which can break the article.

At temperatures above about 800° C the use of a reducing atmosphere is of lesser importance and a vacuum or an inert or non-oxidizing atmosphere such as nitrogen may instead be employed. Also, at temperatures above about 450° C, increased heating rates may be used, since most of the volatile decomposition by-products have by then been driven off, and since stresses resulting from shrinkage of the resin are partly relieved by the concurrent shrinkage of the porous article.

Firing to temperatures of at least about 1,200° C is preferred to insure complete decomposition of the impregnant to carbon and, in the case of a porous glass, to allow the glass and porous carbon to consolidate to a dense, glassy, composite material. High-temperature soaking at these temperatures for periods of at least about one-half hour are useful in achieving this result. Even in the case of porous ceramic structures which are not to be consolidated by heating, firing temperatures of at least about 1,200° C in an inert atmosphere are useful in increasing the oxidation resistance of the carbon phase.

After complete conversion of the impregnant to carbon, any articles which remain porous should be gradually cooled in nitrogen to at least about 400° C prior to removal from the furnace to prevent oxidation of the carbon. On the other hand, the cooling of a consolidated carbon glass is limited only by its thermal shock resistance, since an impervious glassy layer protects the carbon from oxidation. Thus, consolidated carbon-glasses may safely be employed at elevated temperatures even under oxidizing conditions.

The following example illustrates in detail a procedure for using furfuryl alcohol in the process of the present invention.

EXAMPLE I

Eleven strips of porous glass, 3½ inches × 1 centimeter × 1.6 millimeters in size, were cut from porous glass tubing. The tubing had been washed in 1 N $HNO_3$ and rinsed in distilled water at 95° C to remove any soluble contaminants, such as alkali, which might have been present in the pores of the glass, and to reduce any residual acid remaining in the glass from the leaching process which could induce non-uniform polymerization of the furfuryl alcohol and thus non-uniform impregnation of the glass. The tubing was composed of a glass which consisted of at least about 98 percent silica by weight, about eight parts per million $Na_2O$ on a dry basis, and less than 2 percent by weight $B_2O_3$, having an average pore size of about 40A and surface area of about 240 square meters per gram.

The strips of porous glass were oven-dried in air and then each was immersed in a different impregnating solution, composed of pure furfuryl alcohol, pure distilled water, or mixtures thereof, with the immersion process being continued for about 20 hours at room temperature to assure thorough impregnation.

The impregnated strips were then removed from the impregnating solution, rinsed in distilled water (5 seconds) wiped, placed in an oven at 45° C and gradually heated over a period of about 7 hours to 150° C in air. Upon cooling and removal from the oven, all but the distilled water-impregnated sample were black as the result of the polymerization of the furfuryl alcohol in the glass to a black, non-volatile resin.

Following the above heating process, the eleven samples were placed in 42 millimeter I.D. VYCOR brand glass tubes and fired in an electric furnace to convert the resin to carbon. This process comprised firing initially in forming gas (92 percent $N_2$, 8 percent $H_2$ by volume) flowing through the tubes at a rate of about 80 cc. per minute while heating at a rate of about 21° C per hour from about 100° C to a temperature in the range from about 500°–550° C, and further heating at a rate of about 100° C per hour to a temperature in the range from about 850°–900° C. Thereafter, the samples were further heated at a rate of about 100° C per hour, in nitrogen flowing through the tubes at a rate of about 280 cc per minute, from a temperature in the range from about 850°–900° C to a temperature of about 1,250° C and maintained at that temperature in flowing nitrogen for about one-half hour. The samples were then cooled and removed from the furnace.

The annealing points of the final glasses, measured on a beam bending viscosity measuring apparatus, together with the compositions of the corresponding impregnating furfuryl alcohol solutions, are set forth in Table I below, and are also presented graphically in FIG. 1 of the drawing. The data show that the annealing point of the porous high-silica glass may be increased from about 1,023° C to about 1,135° C, with only a small concentration of furfuryl alcohol needed to bring about a greater-than-100° C increase in the annealing point. FIG. 1 of the drawing shows that the annealing point curve remains essentially flat over the concentration range of about 10 to 100 volume percent furfuryl alcohol, indicating that incorporation of additional carbon in the glass does not improve the annealing point. The average annealing point of the samples, excluding Sample 1 which was treated only with distilled water, was 1,135° C.

TABLE I

ANNEALING POINTS OF TREATED GLASSES

| Sample No. | Volume of Furfuryl Alcohol | Annealing Point ($10^8$ poises) |
|---|---|---|
| 1 | 0 | 1023°C |
| 2 | 10 | 1138°C |
| 3 | 20 | 1134°C |
| 4 | 30 | Not measured |
| 5 | 40 | 1138°C |
| 6 | 50 | 1129°C |
| 7 | 60 | 1138°C |
| 8 | 70 | 1133°C |
| 9 | 80 | 1137°C |
| 10 | 90 | Not measured |
| 11 | 100 | 1135°C |

In the following example, the viscosity-temperature characteristics of a carbon-impregnated glass prepared according to the process of the present invention are compared with the viscosity-temperature characteristics of a carbon-impregnated glass prepared according to a prior art process.

EXAMPLE II

Two identical strips of porous glass tubing having the composition of the strips described in Example I were washed, rinsed, and dried as described in Example I. One strip was then immersed in a solution composed of 50 milliliters of distilled water and 50 grams of sucrose, while the other strip was immersed in a solution composed of 50 milliliters of distilled water and 50 milliliters of furfuryl alcohol. Both strips remained in their respective solutions for 16 hours at room temperature to insure thorough impregnation of the pore structure of the glass.

After immersion, the strips were removed from the solutions, rinsed in distilled water (5 seconds), wiped, and then gradually heated in an oven from 50° to 130° C to remove moisture and polymerize the furfuryl alcohol.

Following this heating process, the strips were fired according to the procedure described in Examples I. The firing process comprised heating initially in forming gas flowing over the strips at about 80 cc. per minute, raising the temperature at a rate of about 21° C per hour from about 130° C to about 440° C, and at a rate of about 160° C per hour from 440° C to about 770° C. Thereafter, the strips were further heated at a rate of about 100° C per hour in nitrogen flowing over the strips at about 28 cc per minute, raising the temperature from about 770° C to about 1,230° and maintaining at that temperature for about one-half hour. Finally, the strips were gradually cooled to room temperature in nitrogen and removed from the furnace.

Figure 2:
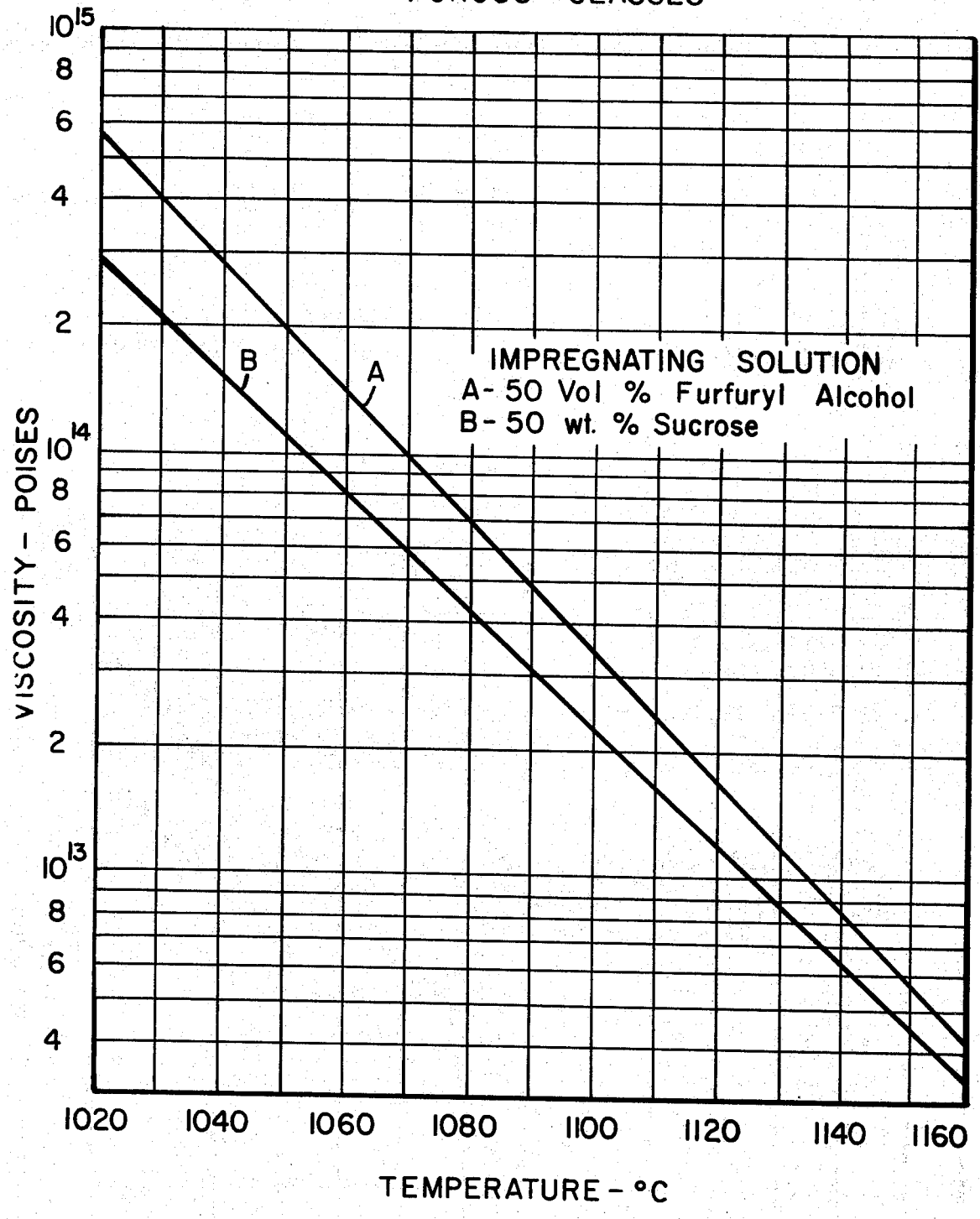
FIG. 2 of the drawing consists of a plot of viscosity in poises versus temperature in degrees centigrade for two carbon-containing glasses, one produced according to the process of the present invention and one produced according to a wellknown prior art process. The higher viscosity of the glass produced according to the process of the present invention is evident; this viscosity-temperature relationship makes the carbon-containing glasses of the present invention eminently suitable for use in high temperature applications.

The viscosity-temperature curves of the carbon-containing strips produced as described were then determined on a beam bending viscosity measuring apparatus with the results shown in FIG. 2 of the drawing. The curve denominated "A" is the curve obtained from the furfuryl alcohol-impregnated carbon-glass, and the curve denominated "B" is the curve obtained from the sucrose-impregnated glass. From a study of FIG. 2 it is apparent that the carbon-glass prepared according to the process of the present invention exhibits significantly better high temperature hardness than the glass prepared according to the prior art, having a higher viscosity (vertical axis) at each temperature (horizontal axis) in the entire range from about 1,020°–1,160° C.

Other examples of carbon-impregnated articles prepared according to the process of the present invention include carbon glasses prepared with mixtures of furfural and phenol, as well as carbon glasses prepared with mixtures of furfural and aniline. The procedures employed in the preparation of these glasses were similar to the procedure outlined in Example I above. Typically, the annealing point of these glasses ranged from about 1,130°–1,135° C. Also, carbon glasses with log DC resistivities as low as 1 ohm-centimeter have been prepared using pure furfuryl alcohol as the impregnant.

We have found that the desirable thermal and electrical properties typical of our glasses may be obtained over a wide range of varying process conditions. Hence, while we typically employ impregnation treatments of about 16–24 hours for porous glasses, treatments may usefully range from as long as desired to as short as is required to achieve some impregnation of the porous refractory material. This will, of course, depend on the extent and nature of the porosity of the material as well as the thickness of the article.

Similarly, the rate of heating the impregnated refractory porous structure and heating temperature employed to achieve condensation and polymerization of the furan derivative is not critical. Heating rates of up to about 200° C per hour can be employed if desired, and in the case of certain porous glasses, minor amounts of boric acid present in the glass or traces of dilute nitric acid remaining from leaching processes can cause complete resinification of furfuryl alcohol at temperatures as low as about 150° C, with the resulting polymer being highly cross-linked with up to four linkage points per monomeric unit.

The pyrolysis of the furfuryl alcohol resin yields $H_2O$, $CO$, $CO_2$, $CH_4$, $H_2$ and carbon as the principal products of pyrolysis, with a coke reside comprising about 60 percent by weight of the resin remaining after heating to 1,000° C. This resin undergoes a linear shrinkage of 20 percent corresponding to a volume shrinkage of about 50 percent, with the maximum rate of shrinkage occurring at around 500° C and essentially complete shrinkage at 1,000°–1,200° C. The end product of the pyrolysis is a nonporous, isotropic, glasslike carbon having a density of about 1.5 grams per cc.

From the foregoing description and examples, it is apparent that the process of the present invention provides a useful means for producing carbon-containing refractory articles offering improved thermal and electrical properties for many applications, and that the process disclosed offers advantages of both reproducibility and convenience over carbon-impregnation methods known in the prior art.

We claim:

1. A process for manufacturing a carbon-impregnated glass article having an annealing point ($10^{13}$ poise viscosity) of at least about 1,130° C. which comprises the steps of:
   a. impregnating a porous 96 percent silica glass article with a polymerizable furan derivative;
   b. polymerizing the furan derivative in situ in the glass article to form a resin; and
   c. firing the glass article in a non-oxidizing atmosphere to a temperature of at least about 1,200° C. to convert said resin to carbon.

2. A process according to claim 1 wherein the polymerizable furan derivative is selected from the group consisting of furfuryl alcohol, furfural, and furfuramide.

3. A process according to claim 2 wherein the step of polymerizing the furan derivative in situ in the glass article comprises heating the glass article to a temperature at least sufficient to promote condensation and polymerization of said furan derivative.

4. A process according to claim 3 wherein the step of firing the glass article in a non-oxidizing atmosphere comprises heating the glass article in a reducing atmosphere to a temperature of at least about 800° C.

* * * * *